Sept. 2, 1924. 1,507,506

A. E. MURPHY

SELF PROPELLED TRAVELING IRRIGATOR

Filed Feb. 3, 1922

Inventor:
Albert E. Murphy
By
Attorney

Patented Sept. 2, 1924.

1,507,506

UNITED STATES PATENT OFFICE.

ALBERT EDWARD MURPHY, OF SWANBOURNE, NEAR PERTH, WESTERN AUSTRALIA, AUSTRALIA.

SELF-PROPELLED TRAVELING IRRIGATOR.

Application filed February 3, 1922. Serial No. 533,917.

*To all whom it may concern:*

Be it known that I, ALBERT EDWARD MURPHY, a subject of the King of Great Britain, residing at 6 Alexander Avenue, Swanbourne, near Perth, Western Australia, Commonwealth of Australia, have invented certain new and useful Improvements in Self-Propelled Traveling Irrigators, of which the following is a specification.

Figure 1:
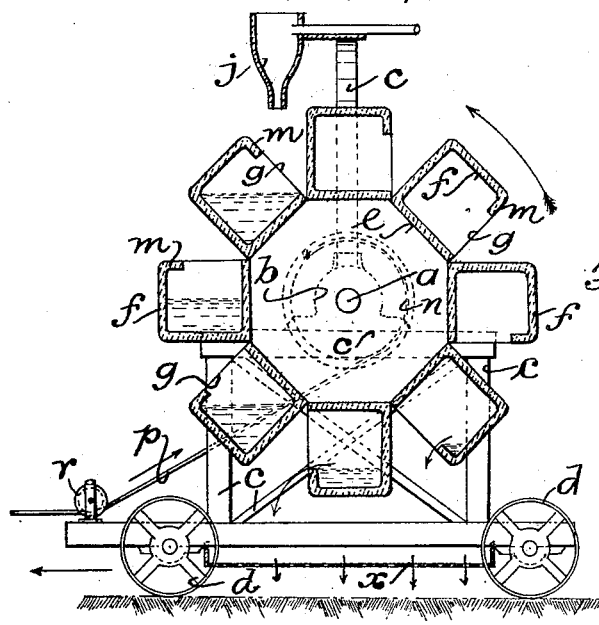
Figure 2:
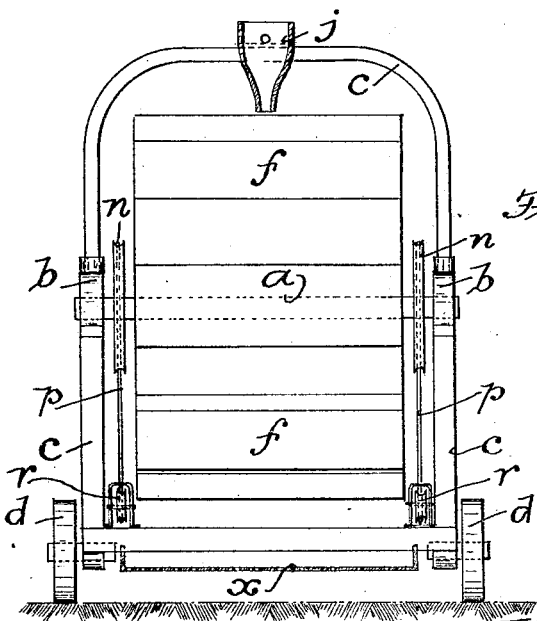

This invention provides an irrigator which is adapted to travel backwards and forwards from one end to the other of the lawn or other surface being irrigated and to be self propelled through the agency of a water wheel installed thereon thus dispensing with the labor of dragging hose pipes and the like during the watering operations and also economizing time. A water hose pipe is connected to the irrigator for the supply of the feed water to the rotatable water wheel and also to supply any sprinkler devices which are installed on the irrigator. The construction and use of the invention will now be explained with the aid of the attached drawings wherein Fig. 1 is a side elevation of an irrigator embodying the invention and showing the water chambers in section and as at work. The arrows denote the direction of travel of the irrigator. Fig. 2 is an end view.

Referring to said drawings, the water wheel is rotatably mounted on a transverse shaft $a$ carried in bearings $b$, said bearings being bolted to the carriage frame $c$. The frame $c$ is mounted on four ground wheels $d$ in order that the irrigator may be easily propelled and pulled during its work on the lawn or area being irrigated. On said rotatable shaft $a$ is keyed a hub $e$ preferably formed with eight faces; and on each of said faces is seated and secured a water chamber as $f$ preferably of the shape as shown. Each of the chambers $f$ has an opening $g$ through which the water enters said chambers from the launder $j$ which is attached to and carried on the irrigator. The launder is fed by flexible pipe from any source of water supply.

Each of the water chambers $f$ has a lip $m$ whose object is to prevent an undesirable or early overflow of the water and to retain same in its chamber until the latter has reached approximately its lowest position when it begins to empty into the perforated tray $x$ for distribution onto the lawn as seen in Fig. 1. On each side of the hub $e$ and on the shaft $a$ is carried a grooved wheel $n$ of the "free wheel" type of construction and said wheels act as winders or spools and to same are anchored the pull ropes $p$ which are guided and pass under the depression wheels $r$ fitted on the frame $c$ of the irrigator. The ropes $p$ at their other terminals are secured to suitable ground anchors at the end of the lawn being irrigated. It is apparent that, by the rotation of the water wheel, the spool wheels $n$ will wind up the pull ropes $p$ and thereby cause the irrigator as an whole to be pulled or propelled towards the fixed anchors as shown by the directional arrows in Fig. 1 at either end of the lawn as the case may be. The water wheel always rotates in the direction in which the irrigator is travelling.

When the irrigator has arrived at one end of the lawn the pull ropes $p$ are released from the fixed or ground anchors and said irrigator is then placed in a reverse direction of travel and the rope terminals are anchored at the other end of the lawn towards which the irrigator is then intended to travel and be propelled or pulled in manner as hereinbefore explained.

What I claim as my invention and desire to secure by Letters Patent is—

1. A device of the character described comprising a frame, a shaft journaled in said frame, receptacles secured to said shaft and revoluble therewith, said receptacles extending substantially the entire width of the frame, winding wheels carried by said shaft, means for delivering water to said receptacles, a perforated tray beneath said frame and extending substantially the entire width of the frame, and a cable for each of said winding wheels, each of said cables having one end secured to one of said winding wheels and having its opposite end adapted to be attached to a fixed point.

2. A lawn sprinkler of the character described comprising a frame having a perforated tray in the bottom thereof, wheels movably supporting said frame, a shaft journaled in said frame above said perforated tray, a hub having receptacles thereon, said hub and receptacles being adapted to revolve with said shaft in a vertical plane, winding spools attached to said shaft, depression wheels on the lower part of said frame, a cable attached at one end to each of said spools passing under each of said depression wheels and adapted to be attached at its opposite end to a fixed point, and means for delivering a continuous supply of water to the receptacles above said hub.

In testimony whereof I have hereunto set my hand in presence of two subscribing witnesses.

ALBERT EDWARD MURPHY.

Witnesses:
 RICHARD SPARROW,
 FRED H. LAMBERT.